us009766640B2

(12) United States Patent
Okajima et al.

(10) Patent No.: US 9,766,640 B2
(45) Date of Patent: Sep. 19, 2017

(54) SEMICONDUCTOR INTEGRATED CIRCUIT AND POWER SUPPLY CONTROL SYSTEM PROVIDED WITH A PLURALITY OF SEMICONDUCTOR INTEGRATED CIRCUITS (71) Applicant: Socionext Inc., Kanagawa (JP)

(72) Inventors: Yoshinori Okajima, Osaka (JP);
Takahiro Ichinomiya, Osaka (JP);
Kazuhisa Tanaka, Osaka (JP);
Masayuki Taniyama, Osaka (JP);
Hidemi Harayama, Osaka (JP);
Takeshi Yado, Osaka (JP)

(73) Assignee: SOCIONEXT INC., Kanagawa (JP)

( * ) Notice: Subject to any disclaimer, the term of this patent is extended or adjusted under 35 U.S.C. 154(b) by 0 days.

(21) Appl. No.: 15/053,783

(22) Filed: Feb. 25, 2016

(65) Prior Publication Data
US 2016/0179111 A1    Jun. 23, 2016

Related U.S. Application Data (63) Continuation of application No. PCT/JP2014/003386, filed on Jun. 24, 2014.

(30) Foreign Application Priority Data

Aug. 27, 2013 (JP) ................................ 2013-175415

(51) Int. Cl.
G05F 1/10          (2006.01)
G06F 1/32          (2006.01)

(52) U.S. Cl.
CPC .............. G05F 1/10 (2013.01); G06F 1/3296 (2013.01); Y02B 60/1285 (2013.01)

(58) Field of Classification Search
None
See application file for complete search history.

(56) References Cited

U.S. PATENT DOCUMENTS 9,158,359 B2 * 10/2015 Buonpane ............. G06F 1/3209
2013/0136162 A1   5/2013 Gotou et al.
2013/0249290 A1   9/2013 Buonpane et al.

FOREIGN PATENT DOCUMENTS

JP    6-175738 A     6/1994
JP    2009-165250 A  7/2009
(Continued)

OTHER PUBLICATIONS

International Search Report dated Sep. 16, 2014, issued in corresponding International Application No. PCT/JP2014/003386. (w/ partial English translation).

Primary Examiner — Cassandra Cox
(74) Attorney, Agent, or Firm — McDermott Will & Emery LLP (57) ABSTRACT A semiconductor integrated circuit, supplied with a power source voltage generated by a power supplier and having a level determined in accordance with an analog signal, includes: an output unit outputting, as the analog signal, an output voltage signal indicating the power source voltage; an input unit including an input interface identical in specifications to an output interface of the output unit, and receiving an input signal indicating a voltage and input from an outside of the semiconductor integrated circuit; and a voltage control circuit generating the output voltage signal, based on the input signal and operating voltage information indicating a voltage required for an operation of the semiconductor integrated circuit.

11 Claims, 5 Drawing Sheets (56) References Cited

FOREIGN PATENT DOCUMENTS

| | | |
|---|---|---|
| JP | 2011-238741 A | 11/2011 |
| JP | 2013-200858 A | 10/2013 |
| WO | 2012/004935 A1 | 1/2012 |

\* cited by examiner

SEMICONDUCTOR INTEGRATED CIRCUIT AND POWER SUPPLY CONTROL SYSTEM PROVIDED WITH A PLURALITY OF SEMICONDUCTOR INTEGRATED CIRCUITS

CROSS-REFERENCE TO RELATED APPLICATIONS

This is a continuation of International Application No. PCT/JP2004/003386 filed on Jun. 24, 2014, which claims priority to Japanese Patent Application No. 2013-175415 filed on Aug. 27, 2013. The entire disclosures of these applications are incorporated by reference herein.

BACKGROUND

The present disclosure relates to a semiconductor integrated circuit and, in particular, to a technique to control a voltage to be supplied from one power supplier to a plurality of semiconductor integrated circuits.

In recent years, power consumption of semiconductor integrated circuits has been increasing as the circuits have achieved higher performance at faster speed. Meanwhile, there are a growing number of requests for a decrease in the power consumption of such circuits.

A typical technique to implement the reduction of the power consumption is to dynamically control a voltage to be supplied to an internal circuit of a semiconductor integrated circuit (see WO2012/004935, for example).

A configuration disclosed in WO2012/004935 shows a plurality of power suppliers, each provided to a corresponding one of semiconductor integrated circuits. The power suppliers dynamically control the voltages to be supplied to the semiconductor integrated circuits. Another configuration disclosed in WO2012/004935 shows the use of one power supplier to dynamically control the voltages to be supplied to the semiconductor integrated circuits.

SUMMARY

If the voltages are controlled by the power suppliers each corresponding to one of the semiconductor integrated circuits, however, the cost of the control system inevitably increases. Meanwhile, if the one power supplier controls the voltages to be supplied to the semiconductor integrated circuits, the semiconductor integrated circuits have to transmit and receive data to and from one another to determine the voltages.

Specifically, in the control of voltages to be supplied to two semiconductor integrated circuits in the typical technique, the two semiconductor integrated circuits transmit and receive data to and from each other to determine voltages required for the circuits themselves. In the transmission and reception of the data between the semiconductor integrated circuits, required are, for example, a data signal line for transmitting and receiving the data, and a control signal line for controlling the timing of data transmission and reception. Here, each of the semiconductor integrated circuits needs at least two terminals, in addition to a power supplier and a terminal for inputting and outputting a voltage, and each of the at least two terminals corresponds to one of the data signal line and the control signal line. Hence, it is difficult for the circuits to have fewer terminals and wires. In other words, it is difficult to reduce the number of the terminals to one between the devices. Moreover, WO2012/004935 fails to clearly state a configuration in which three or more semiconductor integrated circuits are used. Thus, if more than three semiconductor integrated circuits are connected, each semiconductor integrated circuit might inevitably have more terminals. More terminals result in a higher cost and a larger area for a semiconductor integrated circuit.

In view of the forgoing background, the present disclosure prevents an increase in the number of terminals for a semiconductor integrated circuit even if a power source voltage to be supplied from one power supplier to a plurality of semiconductor integrated circuits is dynamically controlled.

In order to solve the above problems, the present disclosure provides solutions below. Specifically, a semiconductor integrated circuit is supplied with a power source voltage which is generated by a power supplier and has a level corresponding to an analog signal. The semiconductor integrated circuit comprises: an output unit configured to output, as the analog signal, an output voltage signal indicating the power source voltage to be output by the power supplier; an input unit including an input interface, and configured to receive an input signal indicating a voltage and input from an outside of the semiconductor integrated circuit, the input interface being identical in specifications to an output interface of the output unit; and a voltage control circuit configured to generate the output voltage signal, based on the input signal and operating voltage information indicating a voltage required for an operation of the semiconductor integrated circuit.

According to this solution, the voltage control circuit generates the output voltage signal, based on the input signal and the operating voltage information. The input unit may receive the input signal to be input from the outside, and the output unit may feed the output voltage signal back to the power supplier as the analog signal. Then, the power supplier supplies the semiconductor integrated circuit with the power source voltage of which the level corresponds to this analog signal. Hence, the semiconductor integrated circuit may operate on a suitable power source voltage.

Here, in the semiconductor integrated circuit, an input interface of the input unit is identical in specifications to an output interface of the output unit. Hence, the input unit and the output unit are directly connectable to each other. Specifically, the input unit may receive, as the input signal, the analog signal to be output from the output unit.

For example, if the output unit of the first semiconductor integrated circuit and the input unit of the second semiconductor integrated circuit are connected together, and the power source voltage to be supplied from the power supplier to the first and second semiconductor integrated circuits is dynamically controlled, the input unit of the second semiconductor integrated circuit may receive, as the input signal, the analog signal to be output from the output unit of the first semiconductor integrated circuit. Here, the analog signal to be output from the first semiconductor integrated circuit indicates the power source voltage to be supplied to the first semiconductor integrated circuit. Then, the second semiconductor integrated circuit may receive, as the input signal of the second semiconductor integrated circuit itself, the analog signal indicating the power source voltage to be supplied to the first semiconductor integrated circuit. The second semiconductor integrated circuit may determine an analog signal which the circuit itself is to output, based on the input signal and the operating voltage information on the circuit itself.

Specifically, the second semiconductor integrated circuit may feed whichever preferable—either the analog signal from the first semiconductor integrated circuit or the operating voltage information on the second semiconductor integrated circuit itself—back to the power supplier as the analog signal of the second semiconductor integrated circuit itself. This may dynamically control the power source voltage to be supplied from one power supplier to these semiconductor integrated circuits. In addition, just one terminal each is required between the first and second semiconductor integrated circuits.

That is, each semiconductor integrated circuit may include three terminals alone; namely, a terminal to receive an input signal, a terminal to output an analog signal, and a terminal to receive a power source voltage supplied from the power supplier. Such a feature contributes to fewer terminals.

Having fewer terminals prevents an increase in the number of terminals for each semiconductor integrated circuit even if two or more semiconductor integrated circuits are used, and thus contributes to reducing the area and cost of the semiconductor integrated circuits.

A power source control system comprises: a plurality of semiconductor integrated circuits each being the semiconductor integrated circuit; and the power supplier being an only power supplier, wherein the plurality of the semiconductor integrated circuits include a first semiconductor integrated circuit and a second semiconductor integrated circuit, the first semiconductor integrated circuit has the input unit connected to the output unit of the second semiconductor integrated circuit, and the output unit of the first semiconductor integrated circuit is connected to the power supplier.

This may implement a power source control system using a plurality of semiconductor integrated circuits each having fewer terminals, and thus contributes to reducing the area and cost of the entire system.

The present disclosure may prevent an increase in the number of terminals for a semiconductor integrated circuit even if a power source voltage to be supplied from one power supplier to a plurality of semiconductor integrated circuits is dynamically controlled.

DETAILED DESCRIPTION

First Embodiment

Figure 1:
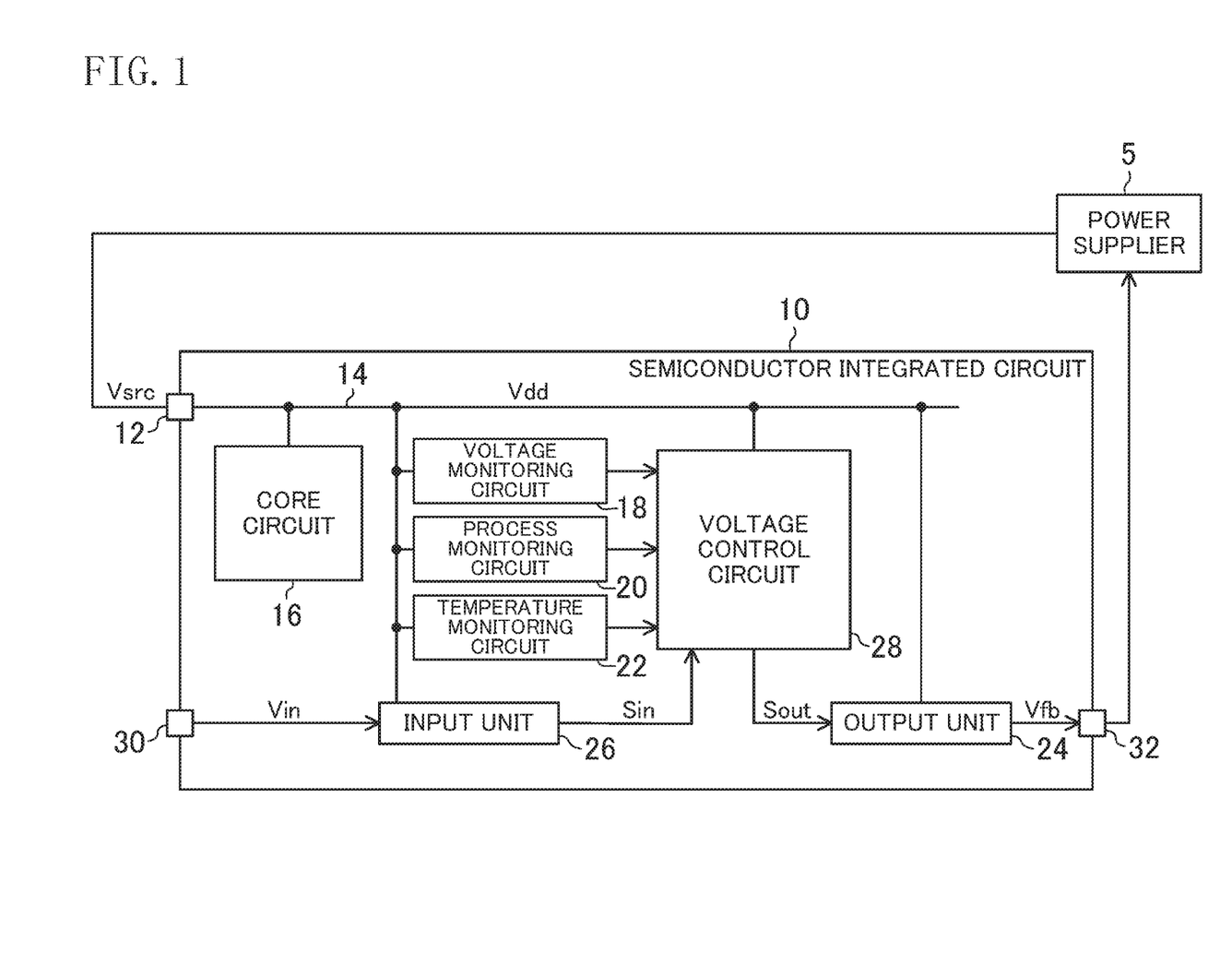
FIG. 1 illustrates a configuration of a semiconductor integrated circuit according to a first embodiment.

FIG. 1 illustrates a configuration of a semiconductor integrated circuit according to a first embodiment. A semiconductor integrated circuit 10 according to this embodiment operates when receiving a power source voltage Vsrc to be supplied from a power supplier 5.

The semiconductor integrated circuit 10 includes an input terminal 12, internal wiring 14, a core circuit 16, a voltage monitoring circuit 18, a process monitoring circuit 20, a temperature monitoring circuit 22, an output unit 24, an input unit 26, a voltage control circuit 28, and terminals 30 and 32.

The input terminal 12 receives the power source voltage Vsrc to be output from the power supplier 5. The internal wiring 14 is connected to the input terminal 12, and distributes the power source voltage Vsrc to each of the circuits in the semiconductor integrated circuit 10. Through this distribution, each circuit in the semiconductor integrated circuit 10 receives a voltage Vdd which is a voltage of the internal wiring 14.

The core circuit 16 operates when receiving the voltage Vdd. The core circuit 16 may be comprised of one logic circuit device or a plurality of logic circuit devices. The core circuit 16 may also be comprised of one device or a plurality of devices.

The voltage monitoring circuit 18 monitors the voltage Vdd of the internal wiring 14, and outputs the voltage Vdd to the voltage control circuit 28 in the form of, for example, a digital value.

The process monitoring circuit 20 outputs the minimum voltage required for the operation of the semiconductor integrated circuit 10. For example, the process monitoring circuit 20 outputs, in the form of a digital value, a voltage value in accordance with a processing performance reflecting, for example, a variation in the manufacturing processing of the semiconductor integrated circuit 10. Here, the performance is the operation speed of a transistor, for example.

Specifically, the process monitoring circuit 20 monitors the processing performance of, for example, the core circuit 16 when the semiconductor integrated circuit 10 is activated or while the semiconductor integrated circuit 10 is operating. Then, the process monitoring circuit 20 outputs, to the voltage control circuit 28, a value in accordance with the result of the monitoring.

Note that the process monitoring circuit 20 may be configured to output information indicating the minimum voltage required for an operation of the core circuit 16—that is, specifically, the operation of the semiconductor integrated circuit 10. Hence, the process monitoring circuit 20 may be configured to previously store, for example, in a hardware-like wire connection, a fixed value in accordance with the processing performance, and to output the fixed value to the voltage control circuit 28.

The temperature monitoring circuit 22 monitors, for example, a temperature of the core circuit 16 as a temperature of the semiconductor integrated circuit 10, and outputs a digital value indicating a voltage value in accordance with the result of the monitoring. The temperature monitoring circuit 22 may include a table having temperatures in association with voltage values, and may output a voltage value, associated with the monitored temperature, to the voltage control circuit 28.

The output unit 24 includes, for example, a digital-to-analog (D/A) converter, and may be configured to convert a digital output voltage signal Sout to be output from the voltage control circuit 28 into an analog signal Vfb, and to feed the analog signal Vfb back to the power supplier 5. The output voltage signal Sout indicates a voltage to be output from the power supplier 5. The analog signal Vfb is output from the terminal 32 to the outside of the semiconductor integrated circuit 10.

The power supplier 5 includes, for example, a step-down converter. More specifically, the power supplier 5 used in this embodiment is assumed to have model numbers such as MP-1472-C452 and MP2303ADN-C258. Hence, the analog signal Vfb conforms to the interface specifications of an FB terminal of which the model number is MP-1472-C452 or MP2303ADN-C258.

Note that the data sheet of the model number MP1472-C452 shows that the feedback voltage to be applied to the FB terminal ranges from 0.900 V to 0.946 V. Alternatively, the data sheet of the MP2303ADN-C258 shows that the feedback voltage to be applied to the FB terminal ranges from 0.788 V to 0.812 V. Hence, the analog signal Vfb indicates a value of the voltage that may be fed back to the power supplier 5.

The power supplier 5 is not limited to the power suppliers having the above model numbers; instead, the power supplier 5 may have any given configuration as long as the power supplier 5 generates and outputs the power source voltage Vsrc of which the level corresponds to the analog signal Vfb.

The input unit 26 includes, for example, an analog-to-digital (A/D) converter, and may receive an input signal Vin to be input from the outside through the terminal 30. The input signal Vin indicates a voltage. Moreover, the input unit 26 has an input interface which is identical in specifications to an output interface of the output unit 24. Hence, the input unit 26 is directly connectable to the output unit 24, and is configured to receive the analog signal Vfb as it is, from the output unit 24. When receiving the input signal Vin, such as the analog signal Vfb, the input unit 26 may convert the received signal into a digital internal signal Sin and output the signal to the voltage control circuit 28.

Note that the input unit 26 does not have to either operate or output the internal signal Sin, unless receiving the input signal Vin.

The voltage control circuit 28 generates the output voltage signal Sout based on the internal signal Sin and operating voltage information, and outputs the generated signal Sout to the output unit 24. Here, the operating voltage information indicates a voltage required for an operation of, for example, the core circuit 16 as an operation of the semiconductor integrated circuit 10. Moreover, the voltage control circuit 28 is configured to compare outputs each from one of the voltage monitoring circuit 18, the process monitoring circuit 20, and the temperature monitoring circuit 22, and to generate the operating voltage information as the result of the comparison.

For example, the voltage control circuit 28 compares the output from the voltage monitoring circuit 18 with that from the process monitoring circuit 20, compares the higher in value of the two outputs with the output from the temperature monitoring circuit 22, and calculates the difference obtained in the latter comparison as the operating voltage information. Moreover, if the internal signal Sin is input, the voltage control circuit 28 compares the internal signal Sin with the operating voltage information, and outputs, for example, the higher in value of the signal and the information as the output voltage signal Sout. On the other hand, if the internal signal Sin is not input, the voltage control circuit 28 may output the operating voltage information as the output voltage signal Sout.

Note that the voltage control circuit 28 may generate the output voltage information based on another element to be implemented on the semiconductor integrated circuit 10. For example, the voltage control circuit 28 may generate the operating voltage information based on, for example, the operating frequency of the core circuit 16 or the number of the core circuits 16 to operate.

Described next is a voltage control operation of the semiconductor integrated circuit 10 in the above configuration.

When the power source voltage Vsrc is supplied from the power supplier 5, the circuits in the semiconductor integrated circuit 10 are activated. Specifically, each of the temperature monitoring circuit 22, the process monitoring circuit 20, and the voltage monitoring circuit 18 outputs a value in accordance with their monitoring results. Then, based on the outputs from these circuits, the voltage control circuit 28 generates the operating voltage information which is a voltage required for the operation of the core circuit 16.

Then, the voltage control circuit 28 compares the internal signal Sin from the input unit 26 with the operating voltage information, and as the result of the comparison, generates and outputs the output voltage signal Sout indicating a voltage to be output by the power supplier 5. Note that, in this embodiment, the internal signal Sin does not have to be input. In this case, the voltage control circuit 28 may output the operating voltage information in the form of the output voltage signal Sout.

The output unit 24 converts the output voltage signal Sout into the analog signal Vfb, and feeds the analog signal Vfb back to the power supplier 5. This allows the power supplier 5 to output the power source voltage Vsrc of which the level corresponds to the analog signal Vfb.

As can be seen, the semiconductor integrated circuit 10 according to this embodiment enables dynamically controlling a voltage, with a comparatively simple configuration. Moreover, the semiconductor integrated circuit 10 may include three terminals alone; namely, the input terminal 12 and the terminals 30 and 32. Hence, the semiconductor integrated circuit 10 needs fewer terminals.

Here, in the semiconductor integrated circuit 10 according to this embodiment, the input interface of the input unit 26 and the output interface of the output unit 24 are identical in specifications, and thus the input unit 26 may receive the analog signal Vfb to be output from the output unit 24. Hence, even though the power source voltage Vsrc, to be supplied from one power supplier 5 to a plurality of semiconductor integrated circuits 10, is dynamically controlled, each of the semiconductor integrated circuits 10 requires fewer terminals. This contributes to reducing the area and cost of each semiconductor integrated circuit 10.

Described now will be how to dynamically control a power source voltage to be supplied from one power supplier to a plurality of semiconductor integrated circuits.

Second Embodiment

Figure 2:
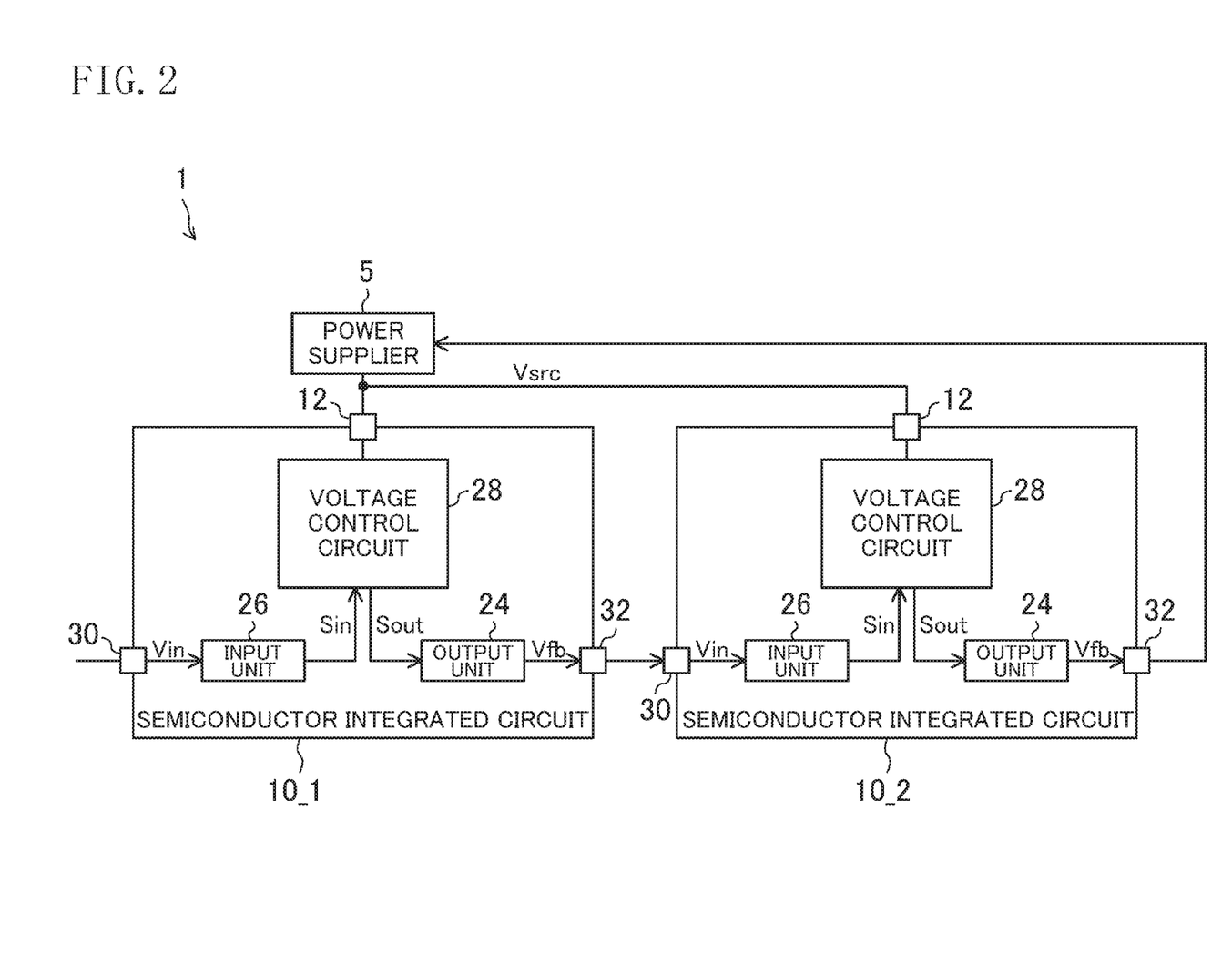
FIG. 2 illustrates a configuration of a power source control system according to a second embodiment.

FIG. 2 illustrates a configuration of a power source control system according to a second embodiment. A power source control system 1 according to this embodiment exemplifies a configuration in which two semiconductor integrated circuits 10_1 and 10_2 share one power supplier 5. For the sake of simplicity, FIG. 2 omits the internal wiring 14, the core circuit 16, the voltage monitoring circuit 18, the process monitoring circuit 20, and the temperature monitoring circuit 22 illustrated in FIG. 1.

In the power source control system 1, the output unit 24 of the semiconductor integrated circuit 10_1 and the input unit 26 of the semiconductor integrated circuit 10_2 are connected together. Hence, the input unit 26 of the semiconductor integrated circuit 10_2 receives the analog signal Vfb, as the input signal Vin, from the output unit 24 of the semiconductor integrated circuit 10_1. This means that the input unit 26 of the semiconductor integrated circuit 10_2 and the output unit 24 of the semiconductor integrated circuit 10_1 may communicate with each other via the same protocol. Specifically, the input interface for the input unit 26 of the semiconductor integrated circuit 10_2 and the output interface for the output unit 24 of the semiconductor integrated circuit 10_1 are identical in the specifications.

The output unit 24 of the semiconductor integrated circuit 10_2 is connected to the power supplier 5. This allows for dynamic feedback control of the power source voltage Vsrc when the two semiconductor integrated circuits 10_1 and 10_2 share one power supplier 5.

Described next will be a voltage control operation of the power source control system 1 according to this embodiment.

Core circuits 16 each included in one of the semiconductor integrated circuits 10_1 or 10_2 are supplied with a voltage Vdd of approximately 1.1 V, for example. In this state, the feedback control is performed on the power source voltage Vsrc.

Specifically, since the input unit 26 of the semiconductor integrated circuit 10_1 does not receive the input signal Vin, the internal signal Sin is not output. Hence, the voltage control circuit 28 of the semiconductor integrated circuit 10_1 outputs operating voltage information in the form of the output voltage signal Sout. If the voltage control circuit 28 determines that a required voltage is higher by 0.12 V than the voltage Vdd at present, based on outputs from the not-shown monitor circuits, the voltage control circuit 28 outputs operating voltage information, indicating that the voltage Vdd is to be raised by 0.12 V, in the form of the output voltage signal Sout.

Then, the output unit 24 of the semiconductor integrated circuit 10_1 converts the output voltage signal Sout into the analog signal Vfb, and outputs the analog signal Vfb to the semiconductor integrated circuit 10_2. Specifically, the semiconductor integrated circuit 10_1 outputs the analog signal Vfb of which the value is the same as that indicated by the operating voltage information.

The input unit 26 of the semiconductor integrated circuit 10_2 receives the analog signal Vfb, as the input signal Vin, from the semiconductor integrated circuit 10_1, and outputs the internal signal Sin. In the semiconductor integrated circuit 10_2, the voltage control circuit 28 compares the internal signal Sin with the operating voltage information, and outputs the result of the comparison in the form of the output voltage signal Sout. If the voltage control circuit 28 generates the operating voltage information indicating that a required voltage is higher by 0.11 V than the voltage Vdd at present, the value indicated by the internal signal Sin (i.e., the value indicated by the analog signal Vfb of the semiconductor integrated circuit 10_1) is greater than the value indicated by the operating voltage information. Hence, the voltage control circuit 28 outputs the internal signal Sin as the output voltage signal Sout.

Then, the output unit 24 of the semiconductor integrated circuit 10_2 converts the output voltage signal Sout into the analog signal Vfb, and feeds the analog signal Vfb back to the power supplier 5.

This enables appropriately and dynamically controlling the power source voltage Vsrc to be supplied from the power supplier 5 to the semiconductor integrated circuits 10_1 and 10_2.

As can be seen in this embodiment, the input interface of the input unit 26 in the semiconductor integrated circuit 10_1 and the output interface of the output unit 24 in the semiconductor integrated circuit 10_2 are identical in specifications, and these interfaces may be directly connected to each other. Hence, between the devices, just one terminal each (i.e., the terminal 30 and the terminal 32) is provided to the devices for one-way communication. Two-way communication is unnecessary. Specifically, each of the semiconductor integrated circuits 10_1 and 10_2 may include three terminals alone; namely, the input terminal 12 receiving the power source voltage Vsrc to be supplied from the power supplier 5, the terminal 30 receiving the input signal Vin, and the terminal 32 outputting the analog signal Vfb. This contributes to implementing a semiconductor integrated circuit having a comparatively simple configuration with fewer terminals.

Hence, the area and cost of the semiconductor integrated circuits 10_1 and 10_2 are successfully reduced. As a result, the increase in area of the power source control system 1 as a whole may be curbed, and the cost of the power source control system 1 may be reduced.

Modified Example 1

Figure 3:
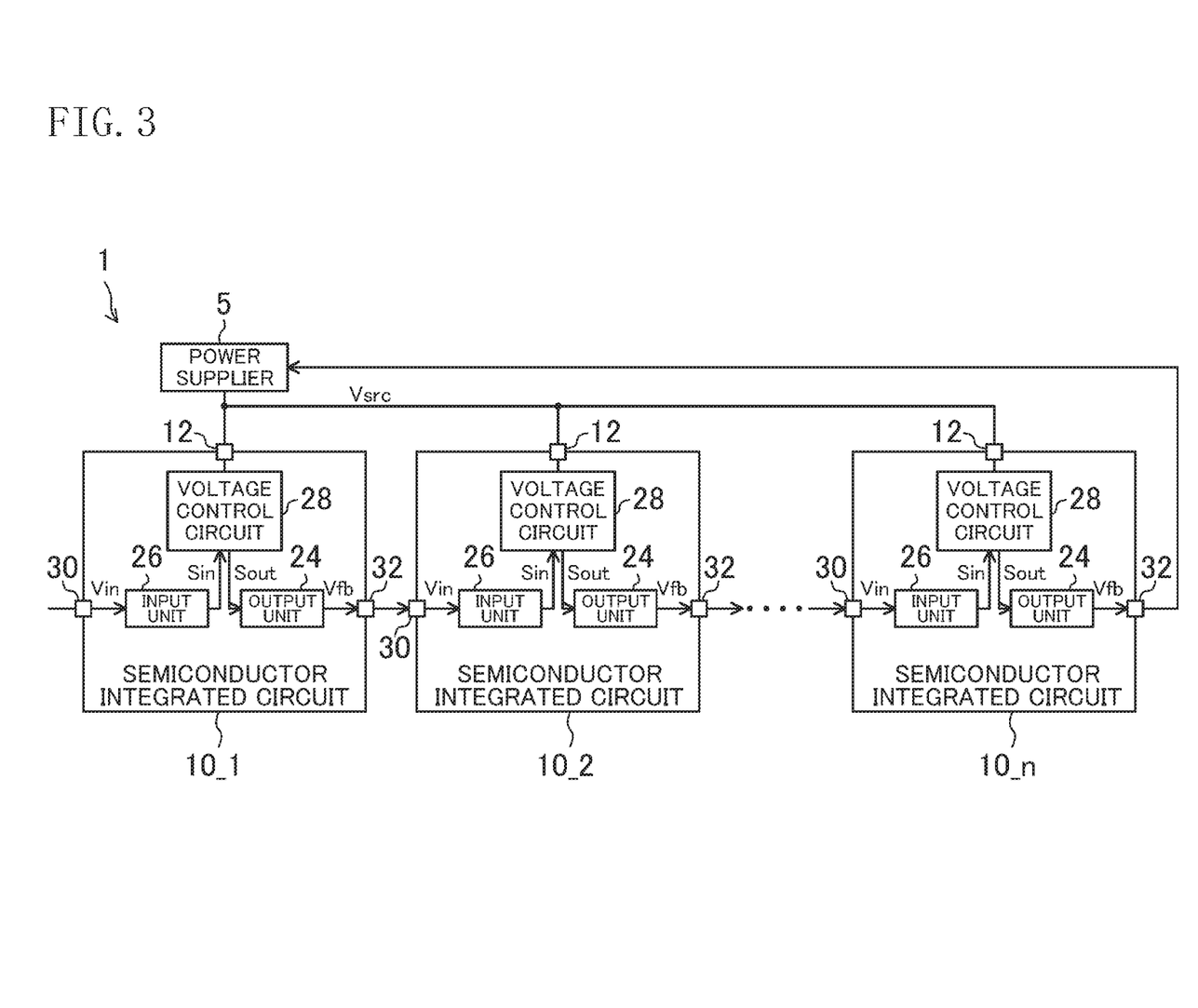
FIG. 3 illustrates a configuration of a power source control system according to Modified Example 1 of the second embodiment.

FIG. 3 illustrates a configuration of a power source control system according to Modified Example 1 of the second embodiment. The power source control system 1 according to this modified example exemplifies a configuration in which n (i.e., n is an integer greater than or equal to 3) semiconductor integrated circuits 10_1 to 10_n are connected in the form of a chain. In other words, the semiconductor integrated circuits 10_1 to 10_n are cascaded.

Specifically, each of the input units 26 of the semiconductor integrated circuits 10_2, 10_3, . . . 10_n in the succeeding stages is connected to a corresponding one of the output units 24 of the semiconductor integrated circuits 10_1, 10_2, . . . 10_n–1 in the previous stages.

Hence, each of the input units 26 of the semiconductor integrated circuits 10_2, 10_3 . . . 10_n in the succeeding stages receives, as the input signal Vin, the analog signal Vfb to be output from the corresponding one of the semiconductor integrated circuits 10_1, 10_2, . . . 10_n–1 in the previous stages.

Then, the output unit 24 of the semiconductor integrated circuit 10_n in the last stage is connected to the power supplier 5.

In the power source control system 1 according to this modified example, each of the n semiconductor integrated circuits 10_1 to 10_n may output whichever preferable, either (i) the analog signal Vfb (i.e., the input signal Vin that each semiconductor integrated circuit itself receives) from the corresponding one of the semiconductor integrated circuits 10_1, 10_2, . . . 10_n–1 in the previous stages or (ii) the operating voltage information that the semiconductor integrated circuit itself generates. This enables supplying the optimum power source voltage Vsrc to each of the semiconductor integrated circuits 10_1 to 10_n.

As can be seen, in the power source control system 1 according to this modified example, one power supplier 5 may be shared in a configuration in which the one-way communication is carried out from the semiconductor integrated circuit 10_1 in the first stage toward the semiconductor integrated circuit 10_n in the last stage. This configuration allows for dynamic feedback control of the power source voltage Vsrc suitable to each of the semiconductor integrated circuits 10_1 to 10_n.

Moreover, in this modified example, the number of terminals is the same for each of the semiconductor integrated circuits 10_1 to 10_n, regardless of the number of the semiconductor integrated circuits. This makes it easy for the semiconductor integrated circuits 10_1 to 10_n to have a single area and form. Consequently, designing the layout of the power source control system 1 is easier.

Note that, in this modified example, the output unit 24 of the semiconductor integrated circuit 10_n in the last stage is connected to the power supplier 5. Instead, any one of the semiconductor integrated circuits 10_2 to 10_n in a stage other than the first stage may be connected to the power supplier 5. For example, the output unit 24 of the semiconductor integrated circuit 10_4 may be connected to the power supplier 5, if operating voltage ranges of the semiconductor integrated circuits 10_5 to 10_n are wider than those of the semiconductor integrated circuits 10_1 to 10_4 and no problem is found as long as voltages are controlled to suit the semiconductor integrated circuit 10_1 to 10_4.

Moreover, in this case, each of the semiconductor integrated circuit 10_5 to 10_n may be provided with a circuit which determines the operating frequency of the circuit itself with reference to a feedback voltage to the power supplier 5.

As can be seen, the semiconductor integrated circuit 10_n in the last stage does not necessarily have to be connected to the power supplier 5.

Modified Example 2

Figure 4:
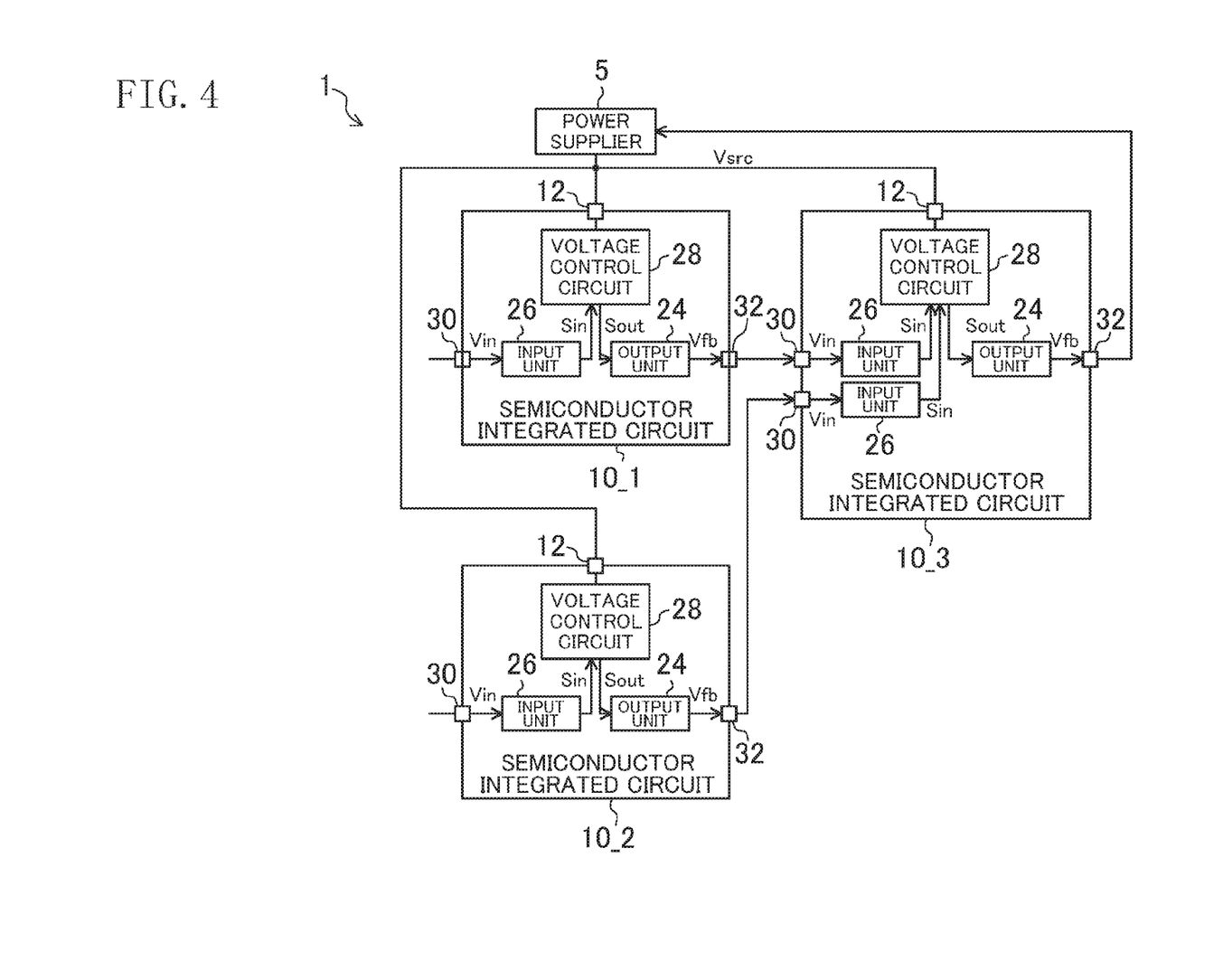
FIG. 4 illustrates a configuration of a power source control system according to Modified Example 2 of the second embodiment.

FIG. 4 illustrates a configuration of a power source control system according to Modified Example 2 of the second embodiment. The power source control system 1 according to this modified example exemplifies a configuration in which three semiconductor integrated circuits 10_1 to 10_3 in FIG. 1 share one power supplier 5.

The power source control system 1 includes three semiconductor integrated circuits 10_1 to 10_3 connected in a tree structure. Specifically, in the tree structure, the semiconductor integrated circuits 10_1 and 10_2 are positioned as leaves (i.e., children), and the semiconductor integrated circuit 10_3 is positioned as the root (i.e., the parent). Note that a leaf node is a terminal node of the tree, and a root node is a top node of the tree. Furthermore, a child node is connected to a parent node.

Among the plurality of semiconductor integrated circuits 10_1 to 10_3 connected in the tree structure, the node (i.e., the semiconductor integrated circuit 10_3 positioned as the parent node) having the children nodes is provided with as many input units 26 and terminals 30 as the children nodes.

In the power source control system 1, each of the input units 26 of the semiconductor integrated circuit 10_3 is connected to a corresponding one of the output unit 24 of the semiconductor integrated circuit 10_1 and the output unit 24 of the semiconductor integrated circuit 10_2, and receives the analog signal Vfb to be outputted from the corresponding one of the semiconductor integrated circuits 10_1 and 10_2.

The output unit 24 of the semiconductor integrated circuit 10_3 is connected to the power supplier 5.

Described below will be a voltage control operation of the power source control system 1 in the above configuration.

Since the input units 26 each for one of the semiconductor integrated circuits 10_1 and 10_2 do not receive the input signal Vin, the voltage control circuits 28 each for one of the semiconductor integrated circuits 10_1 and 10_2 output the operating voltage information in the form of the output voltage signal Sout.

The output units 24 each for one of the semiconductor integrated circuits 10_1 and 10_2 convert the output voltage signal Sout of the units themselves into the analog signal Vfb, and output the analog signal Vfb to the semiconductor integrated circuit 10_3.

Each of the input units 26 in the semiconductor integrated circuit 10_3 receives the analog signal Vfb, output from a corresponding one of the semiconductor integrated circuits 10_1 and 10_2, through a terminal 30 corresponding to one of the semiconductor integrated circuits 10_1 and 10_2. Then, each input unit 26 outputs the internal signal Sin.

In the semiconductor integrated circuit 10_3, the voltage control circuit 28 compares the two internal signals Sin and the operating voltage information, and outputs, for example, the highest in value of the signals and the information in the form of the output voltage signal Sout.

For example, if the internal signal Sin corresponding to the output of the semiconductor integrated circuit 10_1 indicates that the power source voltage Vsrc is to be raised by 0.11 V, the internal signal Sin corresponding to the output of the semiconductor integrated circuit 10_2 indicates that the power source voltage Vsrc is to be raised by 0.12 V, and the operating voltage information indicates that the power source voltage Vsrc is to be raised by 0.09 V, the voltage control circuit 28 may output, as the output voltage signal Sout, the internal signal Sin corresponding to the output of the semiconductor integrated circuit 10_2.

As can be seen in this modified example, the semiconductor integrated circuits 10_1 to 10_3 may be connected in the tree structure to configure the power source control system 1.

Modified Example 3

Figure 5:
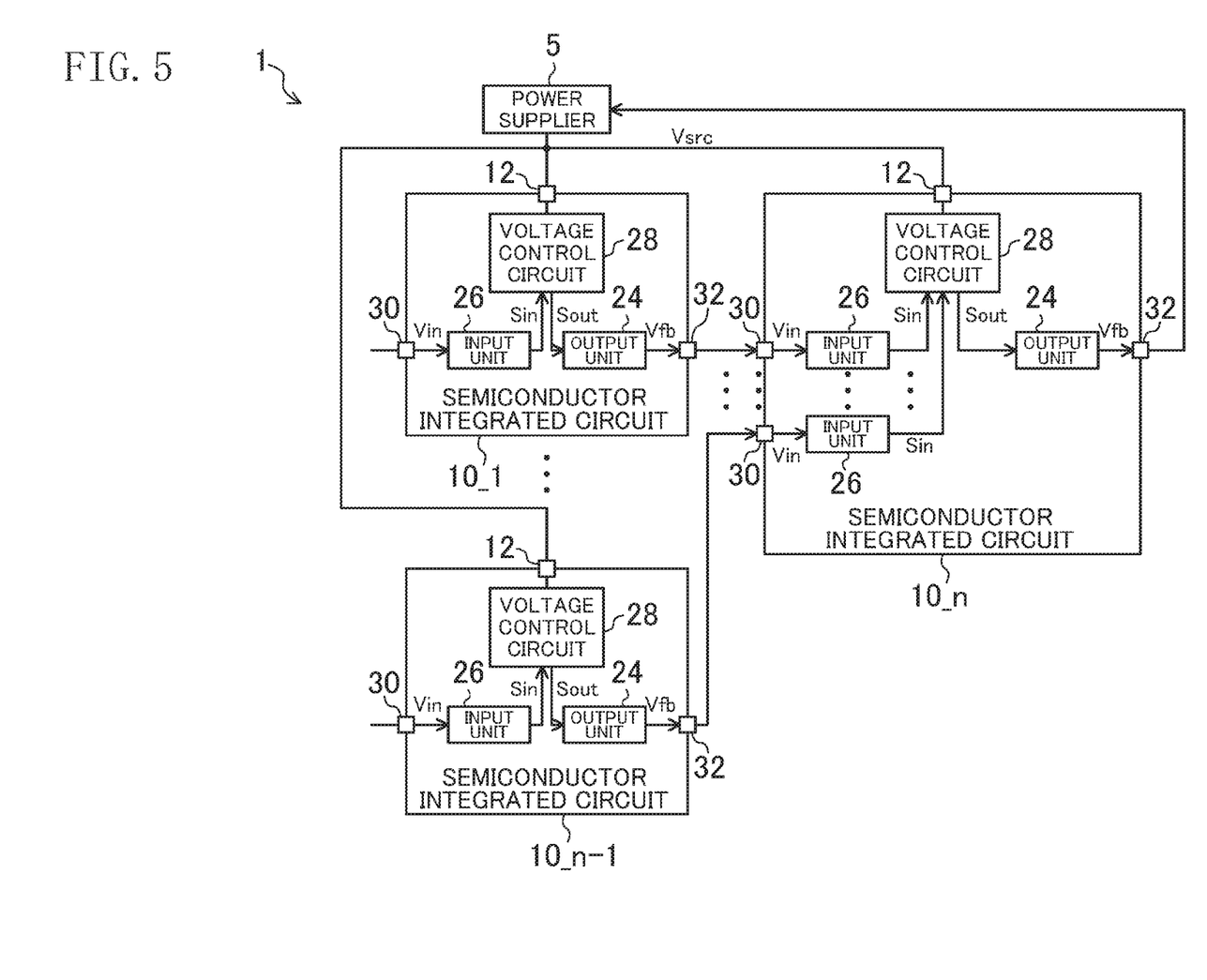
FIG. 5 illustrates a configuration of a power source control system according to Modified Example 3 of the second embodiment.

FIG. 5 illustrates a configuration of a power source control system according to Modified Example 3 of the second embodiment. The power source control system 1 according to this modified example exemplifies a configuration in which n (i.e., n is an integer greater than or equal to 4) semiconductor integrated circuits 10_1 to 10_n are connected in a tree structure.

Specifically, each of the output units 24 included in one of the semiconductor integrated circuits 10_1 to 10_n−1 and positioned as a child node is connected to a corresponding one of the input units 26 of the semiconductor integrated circuit 10_n positioned as the parent node. Then, the output unit 24 of the semiconductor integrated circuit 10_n is connected to the power supplier 5. Moreover, the semiconductor integrated circuit 10_n includes as many input units 26 and terminals 30 as the nodes of the semiconductor integrated circuit 10_n.

In this modified example, the voltage control circuit 28 of the semiconductor integrated circuit 10_n may compare the operating voltage information of the semiconductor integrated circuit 10_n itself with, for example, the highest in value of all the internal signals Sin each corresponding to one of the semiconductor integrated circuits 10_1 to 10_n−1.

Note that, in this modified example, the power source control system 1 may be configured to carry out one-way communication from the semiconductor integrated circuits positioned as leave nodes toward the semiconductor integrated circuit positioned as the root node. Such a one-way communication may allow one power supplier 5 to be shared. Hence, a semiconductor integrated circuit positioned as an intermediate node may be connected to the one power supplier 5. Moreover, any one of the semiconductor integrated circuits positioned as a node other than a leaf node may be connected to the power supplier 5.

For example, if the operating voltage range of a first group of semiconductor integrated circuits positioned as any given one intermediate node and its child node is different from the operating voltage range of a second group of semiconductor integrated circuits other than the first group, and no problem is found as long as voltages are controlled to suit the first group, the output unit 24 of the semiconductor integrated circuit positioned as the intermediate node may be connected to the power supplier 5.

Moreover, in this case, the second group may be provided with a circuit which determines the operating frequency of the circuit itself with reference to a feedback voltage to the power supplier 5.

As can be seen, the semiconductor integrated circuit 10_$n$ positioned as the parent node does not necessarily have to be connected to the power supplier 5.

Furthermore, in each of the embodiments, the semiconductor integrated circuits 10, and 10_1 to 10_$n$ do not have to include all of the voltage monitoring circuit 18, the process monitoring circuit 20, and the temperature monitoring circuit 22, as long as the semiconductor integrated circuits 10, and 10_1 to 10_$n$ may obtain necessary voltages for the operations of the circuits themselves.

Furthermore, in the embodiments, each of the semiconductor integrated circuits may have functions of adjusting the timing of the actually changing output voltage signal Sout after calculating a voltage value which is the value of the output voltage signal Sout. For example, the timing may be adjusted by either measuring the time using an internal timer or switching among a plurality of delay paths each having a different delay amount.

With these functions, for example, a semiconductor integrated circuit located closer to the power supplier 5 successfully shorten time observed until the output voltage signal Sout is changed. This enables reducing, among the semiconductor integrated circuits, the variation of time, of each semiconductor integrated circuit, from the calculation of the optimum voltage value to the actual feedback of the voltage value to the power supplier 5.

Moreover, if the time, in which the once-calculated optimum voltage value is valid, varies because of the processing details of each semiconductor integrated circuit, the timing, observed until the output voltage signal Sout is changed, may be adjusted based on the varying time.

A semiconductor integrated circuit according to this disclosure needs fewer wires and terminals, which is useful for reducing the area and cost of the semiconductor integrated circuit and a power source control system.

What is claimed is:

1. A semiconductor integrated circuit supplied with a power source voltage which is generated by a power supplier and has a level corresponding to an analog signal, the semiconductor integrated circuit comprising:
    an output unit including an output interface, and configured to output via the output interface, as the analog signal, an output voltage signal indicating the power source voltage to be output by the power supplier;
    an input unit including an input interface, and configured to receive via the input interface an input signal indicating a voltage and input from an outside of the semiconductor integrated circuit, the input interface being identical in specifications to the output interface of the output unit; and
    a voltage control circuit configured to generate the output voltage signal, based on the input signal and operating voltage information indicating a voltage required for an operation of the semiconductor integrated circuit.

2. The semiconductor integrated circuit of claim 1, comprising:
    an input terminal configured to receive the power source voltage; and
    internal wiring connected to the input terminal and configured to distribute the power source voltage to each of units in the semiconductor integrated circuit, wherein
    the voltage control circuit generates the operating voltage information, based on a voltage of the internal wiring.

3. The semiconductor integrated circuit of claim 2, comprising
    a voltage monitoring circuit configured to monitor the voltage of the internal wiring, wherein
    the voltage control circuit generates the operating voltage information, based on a result of the monitoring by the voltage monitoring circuit.

4. The semiconductor integrated circuit of claim 1, comprising
    a process monitoring circuit configured to monitor a process of the semiconductor integrated circuit, wherein
    the voltage control circuit generates the operating voltage information, based on a result of the monitoring by the process monitoring circuit.

5. The semiconductor integrated circuit of claim 1, comprising
    a temperature monitoring circuit configured to monitor a temperature of the semiconductor integrated circuit, wherein
    the voltage control circuit generates the operating voltage information, based on a result of the monitoring by the temperature monitoring circuit.

6. The semiconductor integrated circuit of claim 1, wherein
    the input unit converts the input signal into an internal signal, and outputs the internal signal, the input signal being analog and the internal signal being digital,
    the output unit converts the output voltage signal into the analog signal, and outputs the analog signal, the output voltage signal being digital, and
    the voltage control circuit compares the internal signal with the operating voltage information, and outputs a result of the comparison as the output voltage signal, the operating voltage information being digital.

7. A power source control system comprising:
    a plurality of semiconductor integrated circuits each being the semiconductor integrated circuit of claim 1; and
    one power supplier being the power supplier recited in claim 1 wherein
    the plurality of the semiconductor integrated circuits include a first semiconductor integrated circuit and a second semiconductor integrated circuit,
    the first semiconductor integrated circuit has the input unit connected to the output unit of the second semiconductor integrated circuit, and
    the output unit of the first semiconductor integrated circuit is connected to the power supplier.

8. The power source control system of claim 7, wherein
    the plurality of the semiconductor integrated circuits are cascaded,
    the input unit of the semiconductor integrated circuit in a succeeding stage is connected to the output unit of the semiconductor integrated circuit in a previous stage, and receives, as the input signal, the analog signal output from the output unit, and the output unit is connected to the power supplier, the output unit being provided to any one of the plurality of the semiconductor integrated circuits in a stage other than a first stage.

9. The power source control system of claim 8, wherein the output unit, provided to the semiconductor integrated circuit in a last stage, is connected to the power supplier.

10. The power source control system of claim 7, wherein the plurality of the semiconductor integrated circuits are connected in a tree structure, the input unit of the semiconductor integrated circuit, positioned as a node other than a leaf node, is connected to the output unit of the semiconductor integrated circuit positioned as a child node of the node, and receives, as the input signal, the analog signal output from the output unit, the output unit of the semiconductor integrated circuit, positioned as any one node other than the leaf node, is connected to the power supplier, and the semiconductor integrated circuit positioned as a node having one or more children nodes is provided with as many input units, including the input unit, as the one or more children nodes.

11. The power source control system of claim 10, wherein the output unit, provided to the semiconductor integrated circuit positioned as a root node, is connected to the power supplier.

* * * * *